United States Patent
Browne et al.

(10) Patent No.: US 6,877,795 B2
(45) Date of Patent: Apr. 12, 2005

(54) VOLUME FILLING MECHANICAL STRUCTURES FOR MODIFYING CRASH DECELERATION PULSE

(75) Inventors: Alan Lampe Browne, Grosse Pointe, MI (US); Nancy L. Johnson, Northville, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/794,012

(22) Filed: Mar. 5, 2004

(65) Prior Publication Data

US 2004/0169398 A1 Sep. 2, 2004

Related U.S. Application Data

(62) Division of application No. 10/235,083, filed on Sep. 5, 2002, now Pat. No. 6,702,366.

(51) Int. Cl.[7] .............................................. B60R 27/00
(52) U.S. Cl. ................... 296/187.02; 293/135; 293/137
(58) Field of Search ........................ 296/187.03, 189, 296/187.02; 293/133, 135, 137; 280/728.1

(56) References Cited

U.S. PATENT DOCUMENTS

| | | | | |
|---|---|---|---|---|
| 4,565,535 A | * | 1/1986 | Tassy ....................... | 280/728.1 |
| 4,863,771 A | | 9/1989 | Freeman ................... | 428/36.1 |
| 5,042,858 A | | 8/1991 | Schubert et al. ............. | 293/24 |
| 5,360,231 A | * | 11/1994 | Adams ..................... | 280/728.1 |
| 5,382,048 A | * | 1/1995 | Paxton et al. ............. | 280/728.1 |
| 5,411,289 A | * | 5/1995 | Smith et al. ............. | 280/728.1 |
| 5,415,429 A | * | 5/1995 | Fisher ..................... | 280/728.1 |
| 5,588,674 A | * | 12/1996 | Yoshimura et al. ....... | 280/728.1 |
| 5,700,050 A | | 12/1997 | Gonas ........................ | 296/189 |
| 5,727,391 A | | 3/1998 | Hayward et al. ............. | 60/528 |
| 5,810,427 A | | 9/1998 | Hartmann et al. .......... | 293/133 |
| 5,839,756 A | | 11/1998 | Schenck et al. ......... | 280/743.1 |
| 6,073,960 A | | 6/2000 | Viano et al. ............. | 280/730.1 |
| 6,170,857 B1 | * | 1/2001 | Okada et al. ............. | 280/728.1 |
| 6,203,079 B1 | | 3/2001 | Breed ........................ | 293/119 |
| 6,302,458 B1 | | 10/2001 | Wang et al. ................. | 293/132 |
| 6,334,639 B1 | | 1/2002 | Vives et al. ................. | 293/133 |

FOREIGN PATENT DOCUMENTS

| | | |
|---|---|---|
| JP | 4-76274 | 3/1992 |
| JP | 7-42893 | 2/1995 |

OTHER PUBLICATIONS

"Roof–Crush strength Improvement Using Rigid Polyurethane Foam" by K. Killey and A. Mani, SAE International Congress, paper 960435, dated Feb. 26–29, 1996, Detroit MI.

"Hex Web™ Honeycomb Attributes and Properties" booklet of Hexcell Composite Materials, Pleasanton, Ca 94588, dated 1999.

* cited by examiner

Primary Examiner—Lori L. Coletta
(74) Attorney, Agent, or Firm—Kathryn A. Marra

(57) ABSTRACT

A mechanical, active crash pulse management structure for providing modification of crash pulse, wherein the structure has a dormant (initial) state volume, but then in the event of a crash, timely expands into a much larger deployed volume for providing management of an expectant crash energy. The preferred crash energy management structure is a before expansion honeycomb celled material brick, wherein expansion of the honeycomb brick is in a plane transverse to the cellular axis of the cells thereof, and crash crush is intended to be parallel to the cellular axis. In the event of a crash, either an active or passive activation mechanism is provided for causing expansion of honeycomb celled material.

20 Claims, 4 Drawing Sheets

VOLUME FILLING MECHANICAL STRUCTURES FOR MODIFYING CRASH DECELERATION PULSE

This application is a Divisional of 10/235,083 filed on Sep. 5, 2002 now U.S. Pat. No. 6,702,366.

TECHNICAL FIELD

The present invention relates to structures used for modifying a vehicle deceleration pulse (crash pulse), and more particularly to mechanical structures which are volumetrically reconfigurable such as to occupy a small volume when in a dormant state and then rapidly expand to a larger volume in a deployed state when needed for providing crash pulse modification.

BACKGROUND OF THE INVENTION

A vehicle, in addition to the inherent crush characteristics of its structure, may have dedicated crash energy management structures. Their function is exclusively to dissipate energy in the event of a crash. Such dedicated structures have predetermined crush characteristics which contribute to the resulting deceleration pulse to which the occupants are subjected.

In the vehicular arts there are two known types of such dedicated crash energy management structures: those which are passive, and those which are active.

An example of a passive dedicated crash energy management structure is an expanded honeycomb celled material, which has been used to a limited degree in certain vehicles. FIG. 1 exemplifies the process of fabrication of a honeycomb-celled material. A roll 10 of sheet material having a preselected width W is cut to provide a number of substrate sheets 12, each sheet having a number of closely spaced adhesive strips 14. The sheets 12 are stacked and the adhesive cured to thereby form a block, referred to as a HOBE® (registered trademark of Hexcel Corporation) block 16 having a thickness T. The HOBE block is then cut into appropriate lengths L to thereby provide HOBE bricks 18. The HOBE brick is then expanded by the upper and lower faces 20, 22 thereof being separated away from each other, where during the adhesive strips serve as nodes whereat touching sheets are attached to each other. A fully expanded HOBE brick is composed of a honeycomb celled material 24 having clearly apparent hexagonal cells 26. The ratio of the original thickness T to the expanded thickness T' is between 1 to 20 to 1 to 50. An expanded honeycomb celled material provides crash energy management parallel to the cellular axis at the expense of vehicular space that is permanently occupied by this dedicated energy management structure.

Typically, crash energy management structures have a static configuration in which their starting volume is their fixed, operative volume, i.e. they dissipate energy and modify the timing characteristics of the deceleration pulse by being compressed (i.e., crushing or stroking of a piston in a cylinder) from a larger to a smaller volume. Since these passive crash energy management structures occupy a maximum volume in the uncrushed/unstroked, initial state, they inherently occupy vehicular space that must be dedicated for crash energy management—the contraction space being otherwise unstable. Expressed another way, passive crash energy management structures use valuable vehicular space equal to their initial volume which is dedicated exclusively to crash energy management throughout the life of the vehicle even though a crash may never occur, or may occur but once during that time span. This occupied contraction space is not available for other uses, including functions such as vehicle component inspection, servicing and repair. Spaces left open for servicing, repair and operational clearances are thus locations in which passive dedicated crash energy management devices have typically not been used.

Active crash energy management structures have a predetermined size which expands at the time of a crash so as to increase their contribution to crash energy management.

One type of dedicated active crash energy management structure is a stroking device, basically in the form of a piston and cylinder arrangement. Stroking devices have low forces in extension and significantly higher forces in compression (such as an extendable/retractable bumper system) which is, for example, installed at either the fore or aft end of the vehicle and oriented in the anticipated direction of crash induced crush. The rods of such devices would be extended to span the previously empty spaces upon the detection of an imminent crash or an occurring crash (if located ahead of the crush front). This extension could be triggered alternatively by signals from a pre-crash warning system or from crash sensors or be a mechanical response to the crash itself. An example would be a forward extension of the rod due to its inertia under a high G crash pulse. Downsides of such an approach include high mass and limited expansion ratio (1 to 2 rather than the 1 to 20 to 1 to 50 possible with a compressed honeycomb celled material).

Another type of active dedicated crash energy management structure is inflatable airbags or pyrotechnic air cans. Downsides of such systems include low force levels and low ratios of crush force to added mass due to the lack of mechanical rigidity of these systems.

Accordingly, what remains needed in the vehicular arts is a dedicated vehicular crash energy management structure which provides at times other than a crash event open spaces for other uses than crash pulse management, a high level of compression ratio, high crush force, and a low crush force to mass ratio.

SUMMARY OF THE INVENTION

The present invention is a mechanical, active dedicated crash energy management structure for providing modification of crash deceleration pulse (crash pulse), wherein the structure has a dormant (initial) state volume, but then in the event of a crash, timely expands into a much larger deployed volume for providing management of energy of an expectant crash.

The active dedicated crash energy management structure according to the present invention directly addresses the space robbing deficiency of prior art crash energy management structures. It does this specifically by having a small dormant volume (during normal driving conditions) which allows empty space adjacent thereto for operational clearances, serviceability and repair functions, and only assumes a larger deployed volume just prior to, or in response to, a crash.

The principle embodiment of the crash energy management structure according to the present invention is a before expansion honeycomb celled material brick (honeycomb brick) such as for example manufactured by Hexcel Corp. of Pleasanton, Calif., wherein expansion of the honeycomb brick is in a plane transverse to the cellular axis of the cells thereof, and crash crush is intended to be parallel to the cellular axis.

The honeycomb brick occupies anywhere from approximately 1/20th to 1/50th of the volume that it assumes when in it is fully expanded (the expansion ratio) into an expanded honeycombed celled material (expanded honeycomb), depending on the original cell dimensions and wall thicknesses. Honeycomb cell geometries with smaller values of the expansion ratio in general deliver larger crush forces, and the choice of the honeycomb celled material is dependent upon the crush force (stiffness) desired in a particular crash energy management application (i.e., softer or harder metals or composites). Expanded honeycomb has excellent crash energy management capabilities, but only parallel to the cellular axis, as discussed hereinabove.

According to the principal embodiment of the present invention, a honeycomb brick is located adjacent spaces that need to be left open for various reasons, such as exist for example in the engine compartment. The honeycomb brick is placed so that the common cellular axis of its cells is oriented parallel to an envisioned crash axis, i.e., the direction of impact for which it is intended to serve as an energy absorber. A rigid end cap is attached, respectively, to each of the mutually opposed upper and lower end faces of the honeycomb brick (the ends which are perpendicular to the transverse plane and parallel to the crash axis).

In the event of a crash, either an active or passive activation mechanism is provided for moving the end caps away from each other so that the honeycomb brick expands in the transverse plane into the previously unoccupied transversely adjacent space. For example, movement of the end caps may be triggered by an active activation mechanism responsive to signals from a pre-crash warning system or from crash sensors, or by a passive activation mechanism in mechanical response to the crash, itself. Upon expansion, this previously unoccupied space will now function efficiently for crash energy management.

Various embodiments are proposed which allow returning the honeycomb celled material from the deployed (expanded) state to the dormant (unexpanded) state in the event a serious crash does not occur. While various automatic means can be envisioned, the preferred embodiment would involve a manual reset, for example by a trained mechanic at a dealership. For example, the mechanic would compress the honeycomb celled material back to the dormant state, compress an expansion agency (i.e., a spring) and reset a catch of the activation mechanism holding the honeycomb celled material in the dormant state ready for expansion in the event of a forthcoming crash.

Accordingly, it is an object of the present invention to provide a dedicated crash energy management structure, wherein the structure has a small dormant state volume and then in the event of a crash, timely expands into a much larger deployed volume for providing management of an expectant crash pulse.

This and additional objects, features and advantages of the present invention will become clearer from the following specification of a preferred embodiment.

BRIEF DESCRIPTION OF THE DRAWINGS

FIGS. 10A and 10B are top plan views of a first alternative crash energy management device according to the present invention, wherein FIG. 10A depicts the dormant state, and FIG. 10B depicts the deployed state.

FIGS. 11A and 11B are top plan views of a second alternative crash energy management device according to the present invention, wherein FIG. 11A depicts the dormant, and FIG. 11B depicts the deployed state.

FIGS. 12A and 12B are top plan views of a first alternative crash energy management device according to the present invention, wherein FIG. 12A depicts the dormant state, and FIG. 12B depicts the deployed state.

DESCRIPTION OF THE PREFERRED EMBODIMENT

Figure 1:
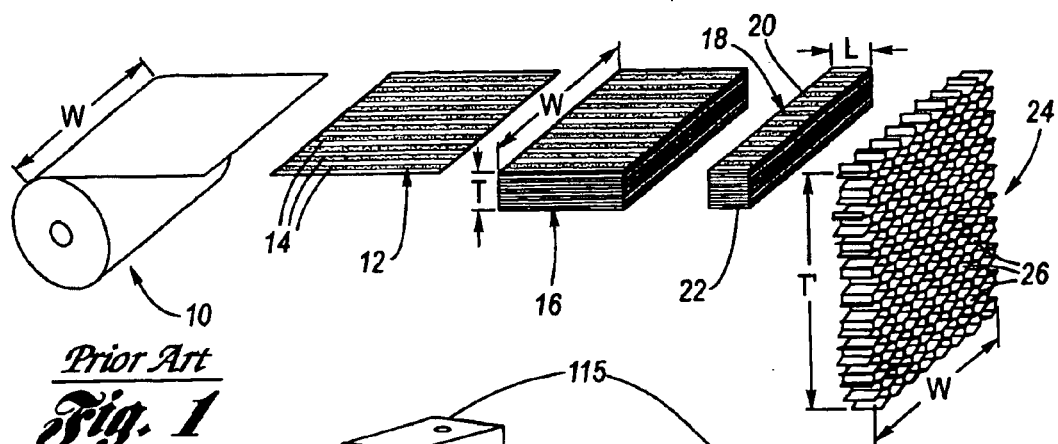
FIG. 1 is a series of perspective views of a manufacturing process to provide a prior art honeycomb celled material.

Referring now to the Drawing, FIGS. 2 through 9 depict a most preferred embodiment of an active dedicated crash energy management structure 100 according to the present invention.

Figure 2:
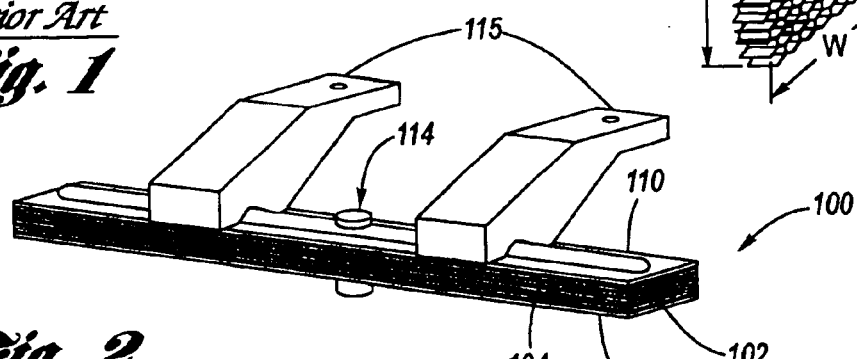
FIG. 2 is a perspective view of a crash energy management device according to the present invention, shown in a before expanded (dormant) state.
Figure 3:
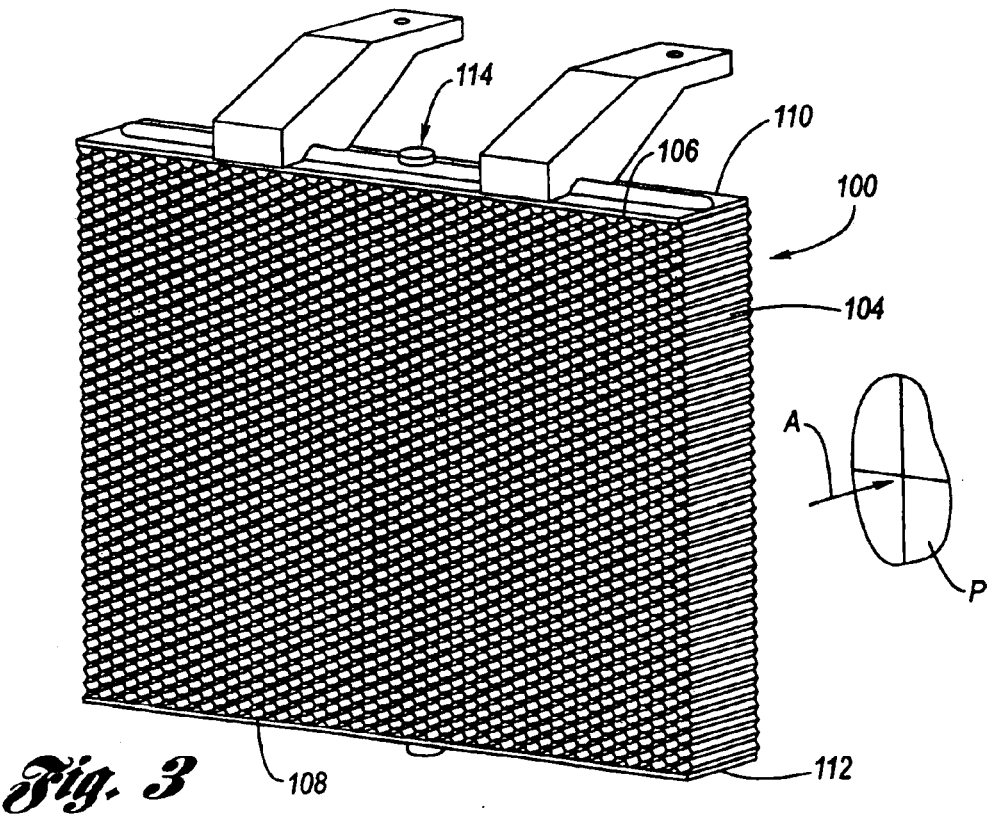
FIG. 3 is a perspective view of the crash energy management device of FIG. 2, shown in an expanded (deployed) state.

A honeycomb brick 102 composed of a honeycomb celled material 104 is provided, as for example according to a method of manufacture utilized to provide HOBE® bricks, as discussed hereinabove. The honeycomb brick 102 is not expanded such that it is at its most compacted state. Attached (such as for example by an adhesive) to the upper and lower faces 106, 108 of the honeycomb brick 102 are respective end caps 110, 112. The end caps 110, 112 are rigid and serve as guide members for defining the configuration of the honeycombed cell material 104 between a dormant state as shown at FIG. 2 and a deployed state as shown at FIG. 3.

The end caps 110, 112 need not necessarily be planar. Indeed, they do not need to have the same shape or size, but for a minimum unexpanded volume the end caps should have the same size and shape. For example, if deployed at a wheel well, the end caps may have a curved shape generally matching the curve of the wheel well. For another example, for expansion into a narrowing wedge shaped space, the end cap which moves as the honeycomb celled material expands may be shorter than the stationary end cap, so that the expanded honeycomb celled material has a complimentary wedge shape.

An activation mechanism 114 is connected to the end caps 110, 112. The activation mechanism 114 controls the state of the honeycomb-celled material in that when activated, a rapid expansion from the dormant state to the deployed state occurs. One or more installation brackets 115 are connected to one of the end caps 110, 112 so that the crash management structure 100 is connectable to a selected component of a motor vehicle.

Figure 4:
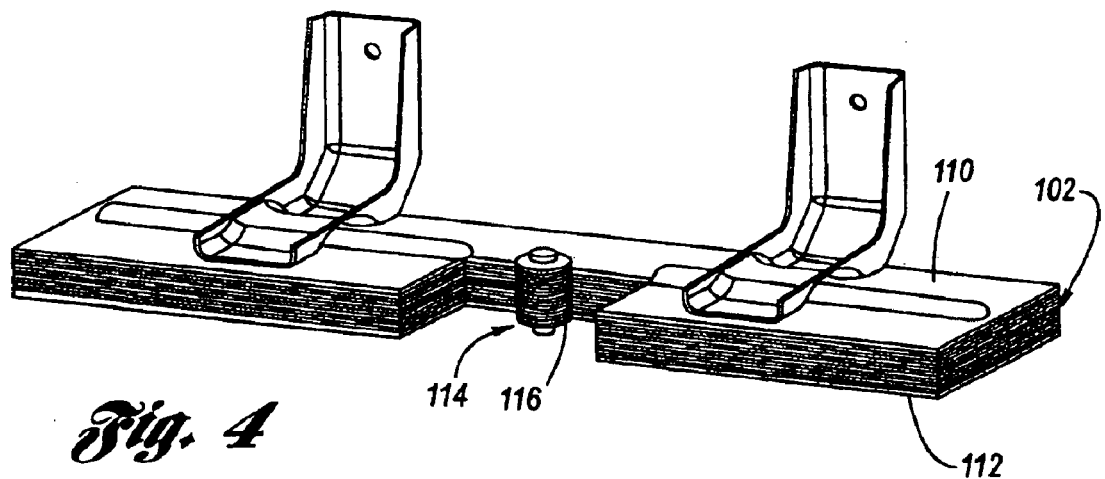
FIG. 4 is a perspective, cut-away view of a crash energy management device according to the present invention, showing an example of an active activation system.
Figure 5:
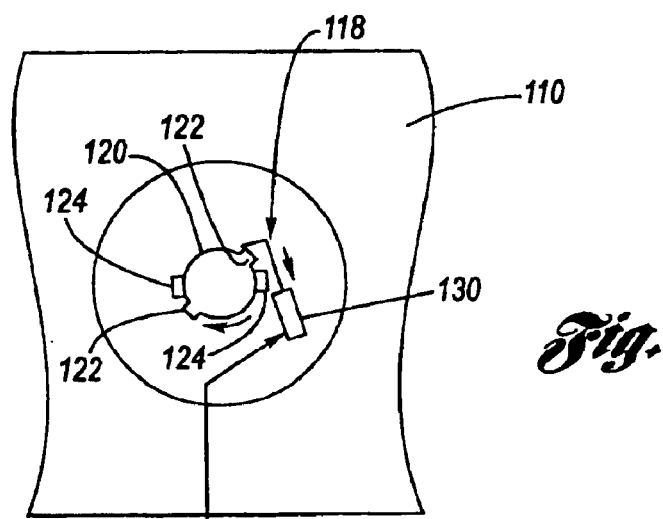
FIG. 5 is a broken-away, top plan view, showing a trigger of the activation system of FIG. 4.

An example of an activation mechanism 114 is shown at FIGS. 4 and 5. An expansion agency in the form of a highly compressed spring 116 is situated abuttingly between the end caps 110, 112. The spring 116 is held highly compressed selectively by a trigger 118. The trigger 118 includes a disk 120 which is rotatably mounted to an end cap 110, wherein the disk has a pair of opposed fingers 122 which are receivable by a pair of opposed slots 124 formed in the end cap. In an active form, the activation mechanism 114 is triggered by a signal from a crash sensor 126 which signal is interpreted by an electronic control module 128, which in response sends an activation signal to a solenoid 130. The activation signal causes a rotation of the disk 120 so as to cause the fingers 122 to fall into the slots 124 and thereupon the spring to rapidly decompress resulting in the honeycombed cell material to rapidly expand from the dormant state of FIG. 2 to the deployed state of FIG. 3. Other expansion agencies besides a compressed spring may include a pyrotechnic device or a pressurized air cylinder. Alternatively, the activation mechanism may be passive and mechanically triggered by a crash due to crash induced movement of vehicle components.

Figure 6:
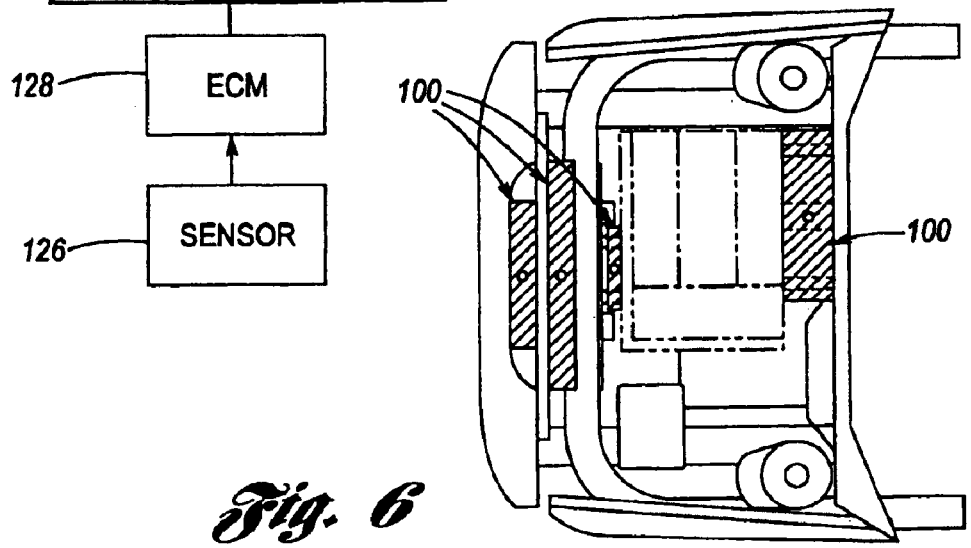
FIG. 6 is a top plan view of an engine compartment of a motor vehicle showing examples of placement of crash energy management devices according to the present invention.
Figure 7:
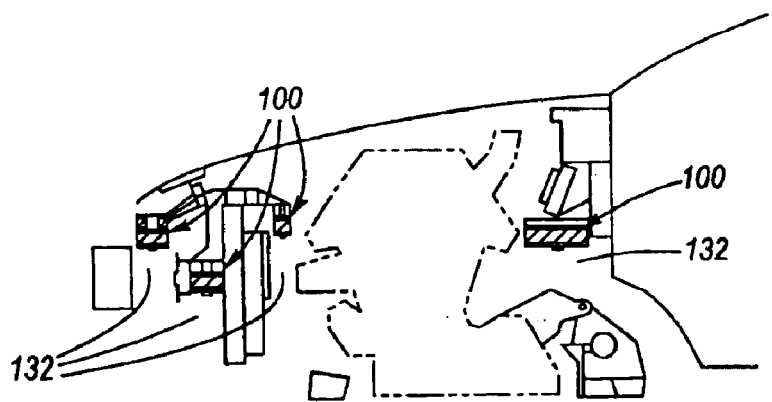
FIG. 7 is a side view of the engine compartment of FIG. 6, showing the crash energy management devices in the dormant state.
Figure 8:
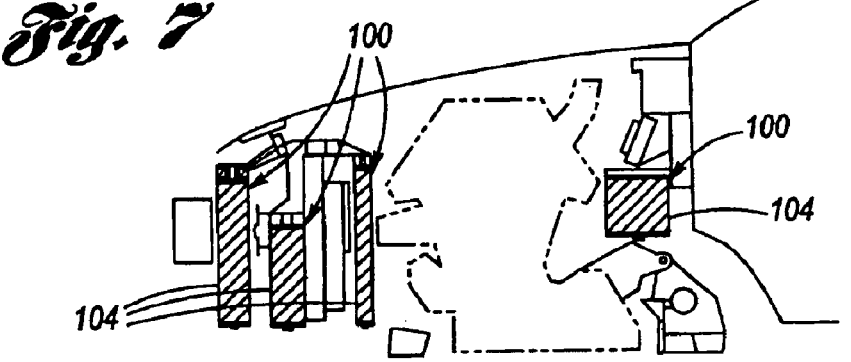
FIG. 8 is a side view of the engine compartment of FIG. 6, showing the crash energy management devices in the deployed state.

FIGS. 6 though 8 show illustrative examples of engine compartment placements of the active dedicated crash energy management structure 100. Placements may also, for example, be located at the empty space behind the bumpers, at the wheel wells, empty spaces surrounding the catalytic converter, exhaust, fuel tank (or hydrogen tank or fuel cell unit), internal to rails in spaces left open for manufacturing, and internal to rails as a means of changing crush force such as to meet particular requirements of different impact scenarios (i.e., offset vs. purely frontal). Placed in rails, the dormant state allows rail servicing, yet the deployed state provides altering the manner in which the encasing rail deforms. As can be seen by comparison between FIG. 7 (showing the dormant state) and FIG. 8 (showing the deployed state), upon triggering of the activation mechanism, the expansion of the honeycomb celled material 104 is in a transverse plane P which is perpendicular to an anticipated crash axis A (see FIG. 3), without expansion or contraction in the crash axis dimension. The expansion of the honeycomb-celled material 104 is into transversely unoccupied space 132.

The dedicated active crash energy management structure 100 should be tailored to the site of application. For example, for sites behind the bumper beam, triggering must be before the start of the crash, and preferably only if the impact involves a collision in excess of 15 kilometers per hour. This would necessitate a pre-crash sensor and an impact severity prediction algorithm in an ECM for proper triggering. The expansion of the honeycomb celled material would be rapid or slow, greater or lesser depending on the sensed nature of the crash. Devices used in this location could be designed to be reversible in the event of a false crash detection, as their deployment has more effect on the operation of the vehicle. For another example, in spaces fore/aft of the engine, or within the wheel wells, such devices may be deployed either before or during a crash. If deployed before the crash, the expansion of the honeycomb celled material could be fast or slow, and would require a pre-crash sensor (and, optimally, with a crash severity algorithm) for triggering. If deployed during a crash, the expansion of the honeycomb-celled material must be rapid, and should occur only at speeds where significant crush will occur. Accordingly, triggering may be effected by crash caused displacements. Devices used in this location would not be reversible and would require a very accurate detection system, as their deployment could interfere with operation of the vehicle.

Figure 9:
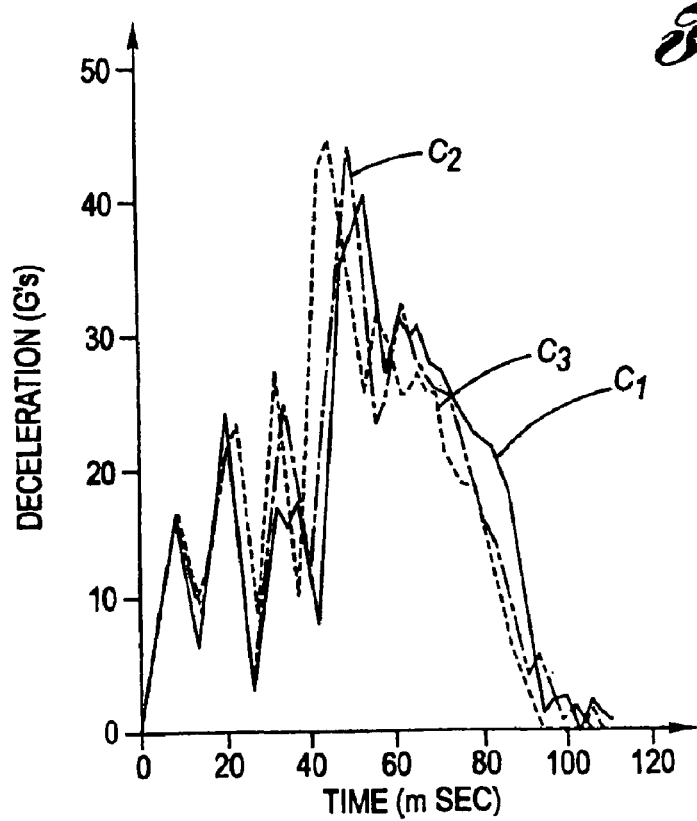
FIG. 9 is a graph exemplifying examples of crash energy modification resulting from the crash energy management device according to the present invention.

With respect to how the deployed state of the honeycomb celled material is able to manage crash energy, FIG. 9 indicates the vehicle deceleration during a crash as a function of time for three cases: $C_1$, a vehicle not equipped with deployed state honeycomb celled material; $C_2$, a vehicle equipped with deployed state honeycomb celled material having a first stiffness; and $C_3$, a vehicle equipped with deployed state honeycomb celled material having a second stiffness. By managing the crash energy through higher crush efficiency (squaring the crash deceleration pulse) and/or through improved occupant safety through tailoring of the crash deceleration trace (such as by front loading), the unfolding deceleration micro-events are selectively timed, as for example the highest deceleration happening before the seat belts are fully pressed upon by the occupants. In this regard, the interior restraints (i.e., air bags and seat belts) should be designed with regard to the crash pulse managing characteristics of the active dedicated crash energy management structures 100 installed in a particular vehicle.

FIGS. 10A through 12B depict alternative examples of crash pulse management structures 200, 300, 400 according to the present invention.

Figure 10A:
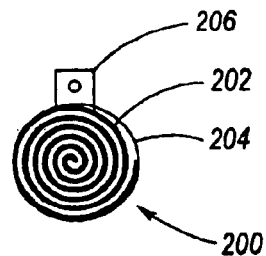

FIG. 10A depicts a coil 202 of compressed spring metal which is held in a compressed (dormant) state by a band 204. A bracket 206 connects the coil to a selected component of a motor vehicle. In the event of a crash, an activation mechanism causes the band to be severed or released, whereupon the coil rapidly expands to a deployed state, as shown at FIG. 10A. The expansion of the coil is in a transverse plane which is perpendicular to the anticipated crash axis. A honeycomb-celled material may be adhesively attached between facing surfaces of the coil spiral, which expands to fill the otherwise open space 208 of the expanded coil spiral.

Figure 11A:
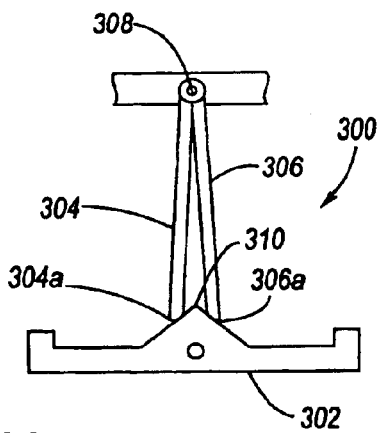
Figure 10B:
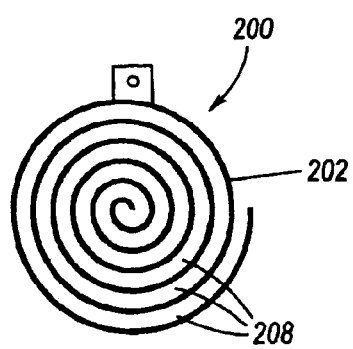
Figure 11B:
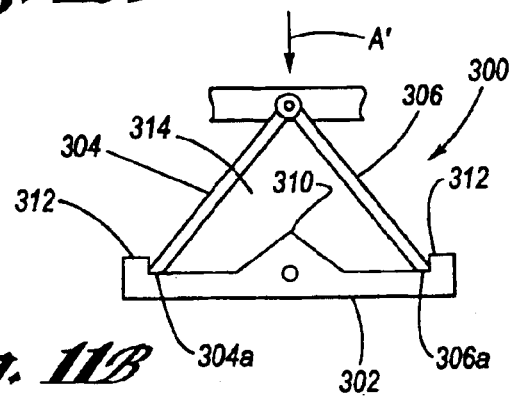

FIG. 11A depicts a V-brace 300 in the form of a base 302 and a pair of arms 304, 306 mutually hinged at an apex 308. The apex 308 is pivotally connected to a first component of a motor vehicle, and the base 302 is connected to an adjacent second component of the motor vehicle along an anticipated crash axis. The distal ends 304a, 306a of the arms 304, 306 are located in mutual adjacency at either side of a pointed boss 310. An abutment 312 is located at each end of the base 302. As shown at FIG. 11B, in event of a crash, the first and second components move toward each other, causing the distal ends of the arms to mutually separate and fixedly lodge at the abutments, whereupon the arms supply crush resistance along the crash axis A'. A honeycomb celled material may be adhesively attached between facing surfaces of the arms, cells aligned in direction A', which expands to fill the otherwise open space 314 between the arms.

Figure 12A:
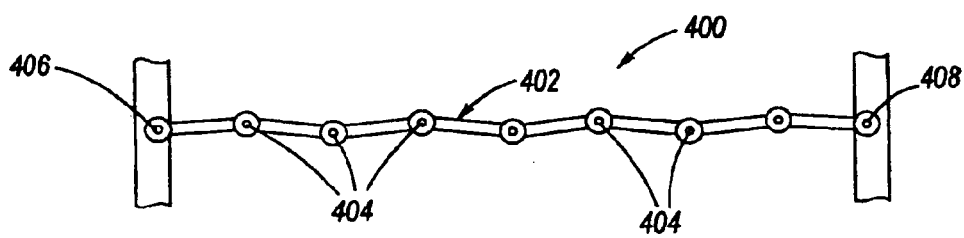
Figure 12B:
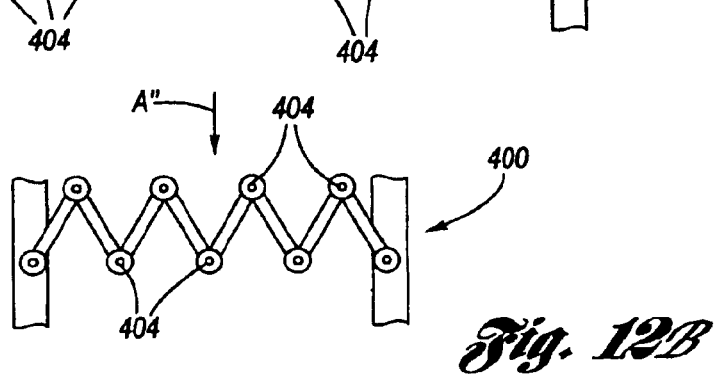

FIG. 12A depicts an accordion 400 composed of an elongated member 402 having a multiplicity of pivots 404. In the event of a crash, the ends 406, 408 of the accordion 400 are brought closer together, thereby causing a pivot action directionally dictated and limited, for example, by ratchet mechanisms at each of the pivots 404, whereupon the accordion attains the expanded volume shown at FIG. 12B which is crush resistant along the crash axis A" (due to, for example, the ratchet mechanisms at each of the pivot points).

To those skilled in the art to which this invention appertains, the above-described preferred embodiment may be subject to change or modification. Such change or modification can be carried out without departing from the scope of the invention, which is intended to be limited only by the scope of the appended claims.

What is claimed is:

1. A method for filling a volume with a mechanical structure for modifying crash deceleration of a motor vehicle, comprising the steps of:
   selectively retaining a mechanical structure in a dormant state where during the mechanical structure has a first volume; and
   expanding the mechanical structure to a second volume, wherein said second volume is larger than said first volume.

2. The method of claim 1, wherein said step of expanding is responsive to a crash.

3. The method of claim 1, further comprising sensing a crash, wherein said step of expanding is responsive to said step of sensing.

4. A motor vehicle equipped with a crash energy management structure, comprising:
   a body; and
   a crash energy management structure connected to said body, said crash energy management structure comprising:
   a mechanical structure connected to said body, said mechanical structure being expandable from a first volume to a second volume, wherein said second volume is larger than said first volume; and
   an activation mechanism regulating expansion of said mechanical structure from said first volume to said second volume.

5. The motor vehicle of claim 4, further comprising a crash sensor system connected to said activation system, wherein said activation system is triggered by said crash sensor system detecting a crash.

6. The motor vehicle of claim 4, wherein said mechanical structure comprises a honeycomb celled material.

7. The motor vehicle of claim 6, further comprising a crash sensor system connected to said activation system, wherein said activation system is triggered by said crash sensor system detecting a crash.

8. The motor vehicle of claim 4, wherein said mechanical structure comprises a spring steel coil.

9. The motor vehicle of claim 8, further comprising a crash sensor system connected to said activation system, wherein said activation system is triggered by said crash sensor system detecting a crash.

10. The motor vehicle of claim 4, wherein said mechanical structure comprises a V-brace.

11. The motor vehicle of claim 10, further comprising a crash sensor system connected to said activation system, wherein said activation system is triggered by said crash sensor system detecting a crash.

12. The motor vehicle of claim 4, wherein said mechanical structure comprises an accordion.

13. The motor vehicle of claim 12, further comprising a crash sensor system connected to said activation system, wherein said activation system is triggered by said crash sensor system detecting a crash.

14. A method for filling a volume with a mechanical structure for modifying crash deceleration of a motor vehicle, comprising the steps of:
   selectively retaining a mechanical structure in a dormant state where during the dormant state the mechanical structure has a first volume of expandable interconnected cells; and
   expanding the mechanical structure to a second volume, wherein the second volume comprises an epansion of the expandable interconnected cells in a plane transverse to a cellular axis.

15. The method of claim 14, further comprising impacting the crash management structure at about parallel to the cellular axis; and absorbing impact energy.

16. A method for absorbing impact energy, comprising:
   deploying a crash management structure from a compact state to an expanded state, wherein the crash management structure comprises a plurality interconnected expandable cells, wherein the expanded state comprises expansion of the expandable cells in a plane transverse to a cellular axis; and
   impacting the crash management structure at about parallel to the cellular axis to absorb the impact energy.

17. The method of claim 16, wherein expanding the crash management structure is in response to or prior to an impact event.

18. The method of claim 16, further comprising resetting the crash management structure from the expanded state to the compact state.

19. A motor vehicle, comprising:
   a body; and
   a crash management structure connected to the body, wherein the crash management structure comprises a plurality of interconnected expandable cells, wherein epansion of the plurality of expandable cells in a plane transverse to a cellular axis.

20. The motor vehicle of claim 19, wherein the crash management structure is about perpendicular to a crash axis.

* * * * *